United States Patent [19]

Flottes et al.

[11] Patent Number: 4,484,353

[45] Date of Patent: Nov. 20, 1984

[54] METHOD FOR CONTROLLING THE INFORMATION STREAM IN A CELL CONSTITUTING SEVERAL RADIO CHANNELS AND A DEVICE FOR CARRYING OUT THIS METHOD

[75] Inventors: Patrick Flottes, Verrieres le Buisson; Daniel Leclerc, Clamart, both of France

[73] Assignee: U.S. Philips Corporation, New York, N.Y.

[21] Appl. No.: 442,546

[22] Filed: Nov. 18, 1982

[30] Foreign Application Priority Data

Nov. 20, 1981 [FR] France ................. 81 21777

[51] Int. Cl.$^3$ .................. H04B 1/00; H04B 7/14
[52] U.S. Cl. ...................... 455/33; 455/17; 455/34; 455/56; 455/58; 340/825.5
[58] Field of Search ............. 455/33, 34, 53, 54, 455/56, 58, 15–17; 370/85, 95; 340/825.5, 825.03; 179/2 EA, 2 EB

[56] References Cited

U.S. PATENT DOCUMENTS 4,352,955 10/1982 Kai et al. .................. 179/2 EB
4,356,484 10/1982 Eckhardt .................. 455/54
4,414,661 11/1983 Karlstrom .................. 455/33

FOREIGN PATENT DOCUMENTS

36146 9/1981 European Pat. Off. ............ 455/33

Primary Examiner—Jin F. Ng
Attorney, Agent, or Firm—Thomas A. Briody; William J. Streeter; Edward W. Goodman

[57] ABSTRACT

This method relates to the control of the information stream in a cell constituted by several radio channels ($C_1$) and ($C_2$), each connecting terminal stations ($T_{1l}$ to $T_{1m}$) and ($T_{2l}$ to $T_{2n}$) to a main station (1) of the cell. In order to assign the ascendent path of a radio channel to a terminal station, the main station transmits in this channel a code signal $S_o$, whereupon the terminal stations transmit calls to be used in call time windows each with an associated priority level. The main station transmits, in answer time windows, code signals dependent upon the received signals: a code signal $S_3$ if the received signal is a distinct call, to give a terminal station the authorization to use the ascendent path, or a sequence of code signals $S_1$ or $S_2$ if the received signal contains, simultaneously, several calls, or does not contain any call. Dependent upon each code signal $S_1$ or $S_2$ received and upon each bit of its address, each terminal station decides whether a new call has to be transmitted or is not to be transmitted, which terminates, according to a dichotomy process, by the transmission of a code signal $S_3$ by the main station.

7 Claims, 6 Drawing Figures

METHOD FOR CONTROLLING THE INFORMATION STREAM IN A CELL CONSTITUTING SEVERAL RADIO CHANNELS AND A DEVICE FOR CARRYING OUT THIS METHOD

BACKGROUND OF THE INVENTION

The invention relates to a method for controlling the information stream in a radio cell constituting several radio channels connecting each of a plurality of terminal stations to a main station of the cell through an ascendent path and a descendent path, these two paths being capable of transmitting code signals together with the information stream, while the information stream to be handled can have several priority levels, this method being intended to grant, from the main station, the authorization to use the ascendent path of each radio channel, to a terminal station among several of these stations that ask for this authorization.

Such a radio cell is used, for example, for covering a region and handling a telephone signal stream and a data stream between the fixed and mobile terminal stations of the cell, or between these terminal stations and outside the cell, that is to say with terminal stations of other cells or a central station common to several cells.

In each radio channel of a cell, the information streams are transmitted from the terminal stations to the main station of the cell, generally through one or several relay stations, while using several carrier frequencies in cascade arrangement forming an ascendent path. Inversely, the streams of information are transmitted from the main station to the terminal stations while using several other carrier frequencies in cascade arrangement forming a descendent path. The communications of the terminal stations of a cell among each other and with the outside are always established through the main station of the cell. Essentially, the main station serves to control these communications.

In the radio cells of this kind known hitherto, the ascendent path and the descendent path of each radio channel are used alternately, which simplifies the control of the communications in the main station, but does not correspond to an optimum use of the two paths. An increase of the information stream can be obtained by using, simultaneously, the two paths for transmitting through them, in opposite senses, data streams, or a stream of telephone signals and a data stream. However, the control of these streams by the main station then becomes more difficult. Thus the control should be carried out so that data streams are fed into the ascendent path and the descendent path of a radio channel, which alternately become unoccupied during a telephone conversation. In fact the most difficult problem to be solved is to ensure that the ascendent path, which has become unoccupied during a telephone signal stream, is assigned automatically and rapidly to a terminal station among several of such stations asking to transmit a data stream.

SUMMARY OF THE INVENTION

The present invention provides a method which permits solving this problem by using, as the only selection criterion, priority levels assigned to the streams to be handled by the terminal stations.

The method according to the invention comprises the following steps:

a. The main station transmits through the descendent path of each radio channel, the ascendent path of which becomes unoccupied, a code signal $S_o$;

b. the terminal stations, having a stream to be transmitted, transmit, through the ascendent path, calls for use of this ascendent path in call time windows, each having assigned thereto a priority level in a decreasing order of priority levels;

c. the main station analyses the signals received in the successive call windows and when at least one signal is received in a call window, it transmits an answer in an answer time window immediately succeeding the relevant call window, in the form of a code signal dependent upon the received signal;

c1. if the received signal is a distinct call, the main station transmits the code signal $S_3$ in order to authorize the terminal station which had initiated the call request to utilize the ascendent path;

c2. if the received signal corresponds to several simultaneous calls, the main station transmits a first code signal $S_1$ which prevents the transmission of the call of lower priority and which causes a dichotomy process to be initiated;

c3. at each stage of this dichotomy process, the main station transmits, in an answer window, one of the code signals $S_1$, $S_2$ or $S_3$ according as it detects in a call window a signal corresponding to several simultaneous calls, to the absence of a call or to a distinct call; each terminal station receiving the code signal $S_1$ or $S_2$ deduces therefrom successively, according to a criterion dependent upon each bit of its address and upon the received code signal $S_1$ or $S_2$, whether a new call is to be transmitted or has not to be transmitted in a call window; when a terminal station receives the code signal $S_3$, it is authorized to utilize the ascendent path.

Preferably, the criterion used for the dichotomy process consists in that each terminal station receiving the code signal $S_1$ or $S_2$ successively compares each bit of its address with a comparison bit having, for the first stage of the process, a determined value and, for the following stages, dependent upon the received code signal $S_1$ or $S_2$, a value equal or opposite to that of the comparison bit used for the preceding stage, a new call being transmitted in a call window if the two compared bits have the same value (or inversely).

In order to avoid that given terminal stations are favored or prejudiced in the assignment of an ascendent path, it is advantageous that the address of the terminal station, utilized in the dichotomy process, is supplied by a random draw effected in each terminal station at the instant of reception of the code signal $S_0$.

The method according to the invention can be used advantageously in the main station and the terminal stations of microprocessor arrangements.

In the main station of the cell, an arrangement associated with each radio channel can comprise a microprocessor which under the control of a detector of the absence of a code signal $S_4$ in the ascendent path (the code signal $S_4$ always accompanying an information signal) controls a code signal generator for the transmission, through the descendent path, of the code signal $S_0$, which then, under the control of a program analysis, during time call windows, the received signals carried by the ascendent path by comparing these signals with predetermined call messages and which finally controls the code signal generator for the transmission, through the descendent path, of one of the code signals $S_1$, $S_2$ or $S_3$ according to the result of the comparison, or for the transmission of the code signal $S_0$.

DESCRIPTION OF THE DRAWINGS

In order that the invention may be readily carried into effect, it will now be described more fully with reference to the accompanying drawings, in which.

DESCRIPTION OF THE PREFERRED EMBODIMENTS

Figure 1:
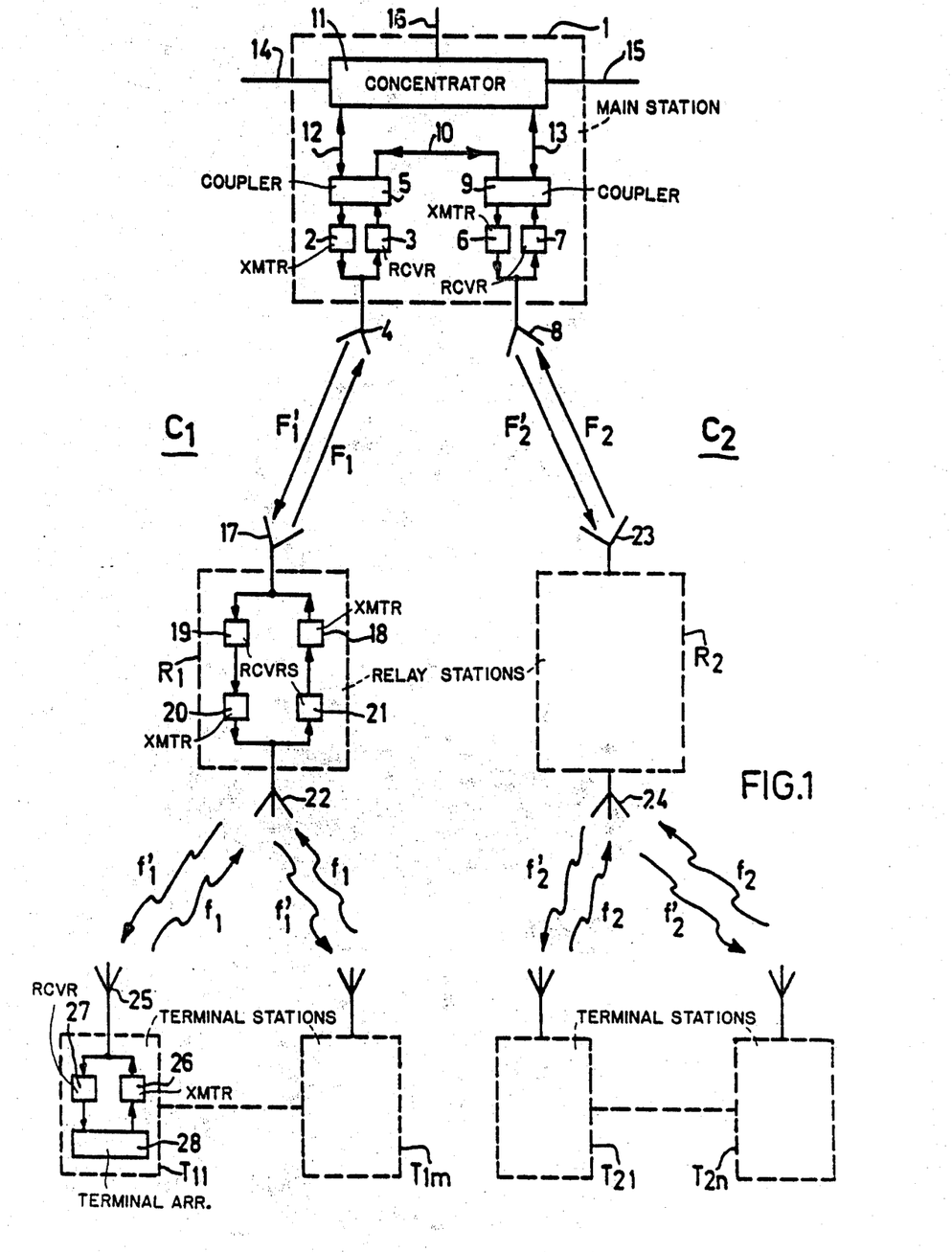
FIG. 1 shows the structure of a radio cell, in which the method according to the invention can be used.

FIG. 1 shows the general structure of a radio cell of a network of communications, in which the method according to the invention can be utilized. This radio cell intended to cover a region comprises a main station 1, which is connected through several radio channels to a given number of terminal stations. All the traffic of these stations travels through the main station. The latter has to control the telephone signal stream or the stream of communication data between the terminal stations of the cell and the stream of communication data from the terminal stations to the exterior of the cell. For the sake of simplicity, only two radio channels $C_1$ and $C_2$ are shown, which serve m terminal stations $T_{1l}$ to $T_{1m}$ and n terminal stations $T_{2l}$ to $T_{2n}$, respectively.

The main station 1 comprises, as to the radio channel $C_1$, a UHF set constituted by a transmitter 2 and a receiver 3 which are connected on one side to a directional antenna 4 for ultra high frequencies and on the other side to a radio-automatic coupler 5. As to the radio channel $C_2$, the main station 1 comprises the elements 6 to 9 which have the same functions as the respective elements 2 to 5 of the channel $C_1$. In the coupler 5 and in the coupler 9, all the means for controlling the traffic concerning the terminal stations of the channel $C_1$ and the terminal stations of the channel $C_2$, respectively, are concentrated. The couplers 5 and 9 are interconnected through the connection line 10, through which the telephone signal stream between the terminal stations of the two channels is handled. The couplers 5 and 9 are moreover connected to a concentrator 11 through the connection lines 12 and 13, respectively, through which the communication data streams of the two radio channels $C_1$ and $C_2$ are handled. The concentrator 11 directs the communication data stream between two channels of the cell, such as $C_1$ and $C_2$. It also directs the stream from one channel of the cell to other cells or to a concentrator of hierarchically higher levels with the aid of radio or wire connections terminating at access terminals, such as 14, 15, 16.

In the simple embodiment shown in FIG. 1, the radio channel $C_1$ comprises a relay station $R_1$ provided with a directional antenna 17 for ultra high frequencies directed towards the antenna 4 to form a technical connection with the main station 1. In the relay station $R_1$, the antenna 17 is connected to a UHF set constituted by a transmitter 18 and a receiver 19, whose access terminals for low-frequency signals are connected, respectively, to a VHF set constituted by a transmitter 20 and a receiver 21. The transmitter 20 and the receiver 21 are connected to an omnidirectional antenna 22 for very high frequencies. The radio channel $C_2$ comprises also a relay station $R_2$ constituted in the same manner and provided with a directional antenna 23 directed towards the antenna 8 and an omnidirectional antenna 24.

The waves emitted by the omnidirectional antenna 22 of the relay station $R_1$ are collected by the antennae of the terminal stations $T_{1l}$ to $T_{1m}$ of the radio channel $C_1$. The terminal station $T_{1l}$ comprises, for example, an antenna 25 which is connected to a VHF set constituted by a transmitter 26 and a receiver 27. The low-frequency input of the transmitter 26 is connected to a terminal arrangement 28, in which units are assumed to be incorporated which are capable of supplying telephone signals or data signals modulated in a MODEM so as to be transmitted in the frequency band of the telephone signals. The low-frequency output of the receiver 27 is also connected to the terminal arrangement 28, in which units are assumed to be incorporated which handle and utilize the received telephone signals or data signals. The waves emitted by the omnidirectional antenna 24 of the relay station $R_2$ are collected by the antennae of the terminal stations $T_{2l}$ to $T_{2n}$ of the radio channel $C_2$. All the terminal stations $T_{2n}$ are constituted in the same manner as the station $T_{1l}$ and consequently comprise terminal arrangements for the transmission and reception of telephone signals or data signals.

In each channel, an ascendent path, through which the signals can be transmitted from the terminal stations to the main station, and a descendent path, through which the signals can be transmitted from the main station to the terminal stations, can be defined. In the radio channel $C_1$, the ascendent path has, as carriers, a carrier frequency $f_1$ transmitted at a given instant between an arbitrary terminal station $T_{1l}$ to $T_{1m}$ and the relay station $R_1$ and a carrier frequency $F_1$ transmitted between the relay station $R_1$ and the main station 1. The descendent path of the radio channel $C_1$ has, as carriers, a carrier frequency $F'_1$ transmitted between the main station 1 and the relay station $R_1$, and the carrier frequency $f'_1$ broadcast transmitted from the relay station $R_1$ so as to be collected by the terminal stations $T_{1l}$ to $T_{1m}$. The radio channel $C_2$ comprises also an ascendent path and a descendent path utilizing as carriers the carrier frequencies $f_2$, $F_2$ and $f'_2$, $F'_2$, as is shown in FIG. 1. It is clear that it is also possible to define an ascendent path and a descendent path in radio channels which have a more complicated structure than the channels $C_1$ and $C_2$ and which can comprise, for example, several relay stations with technical connections established by wires or by radio.

In order to handle a maximum of traffic in the communications network, it is very desirable to use, simultaneously in each radio channel, the ascendent path and the descendent path for transmitting simultaneously, in opposite directions, two data signals or a telephone signal and a data signal. However, difficult tasks must be performed for the organization of the traffic which must be entirely handled from the main station 1. In particular, the streams produced by the terminal stations $T_{1m}$ and $T_{2n}$ must start and stop on the command of the main station 1. The organization of the traffic is particularly difficult during a telephone conversation between two terminal stations of two different radio channels, such as $C_1$ and $C_2$. During this conversation, the direction of transmission of the telephone signals changes frequently in dependence upon the interlocutors and in each radio channel, the ascendent path and the descendent path are alternately unoccupied in the main station 1 in an unforseeable manner. For a satisfactory control, the main station 1 has to rapidly assign a path that has become unoccupied for handling a data stream without disturbing the telephone conversation. When in a radio channel a descendent path becomes unoccupied, no special problems arise in the main station 1 with respect to the handling therein of a data stream in the direction of one or several terminal stations. On the other hand, when an ascendent path becomes unoccupied, the problem arises in assigning this path to a terminal station among several terminal stations asking to handle a data stream in the direction of the main station 1. In particular, the assignment of this path has to be effected only on the basis of the priority level of the stream to be handled without favoring one of the stations having streams at the same priority level.

The present invention provides a method which permits controlling the stream in a radio cell by solving the problem of assigning an ascendent path that is unoccupied to a terminal station. This method utilizes different code signals which can be transmitted through the paths of each radio channel together with the information signals. These code signals are formed with the aid of tones which are transmitted in a so-called supervisory frequency band generally contiguous to the frequency band used for the transmission of the information signals (telephone signals or data signals). If the band used for the information signals is the speech band, extending from 300 to 3000 Hz, an infraspeech band can be used for the supervisory frequency band extending, for example, from 250 to 300 Hz, or a supra-speech band, or even a narrow band within the speech band may be used.

The code signals can be formed, for example, by means of 4 frequencies $F_1$, $F_2$, $F_3$, $F_4$ between 250 and 300 Hz. The code signals, which can be forwarded by the main station 1 in the direction of the terminal stations, that is to say through the descendent path of a radio channel, amount to four and are designated by $S_0$, $S_1$, $S_2$, $S_3$. Each code signal is formed by two tones each lasting 20 periods transmitted consecutively and having two of the 4 frequencies $F_1$ to $F_4$.

Generally speaking, the significance of these code signals is as follows:

The code signal $S_0$ is forwarded to the terminal arrangements 28 to give them an indication that the ascendent path of their respective radio channel is unoccupied.

The code signals $S_1$ and $S_2$ are used to control the streams and especially, as will be explained hereinafter, to select a terminal station asking permission to use the unoccupied ascendent path after reception of the code signals $S_0$.

The code signal $S_3$ is forwarded to the selected terminal station in order to authorize it to forward its information signal through the ascendent path.

Finally, there is a code signal $S_4$ constituted by a tone having one of the frequencies $F_1$ to $F_4$. This code signal $S_4$ is permanently transmitted by the main station 1 or a terminal station while this station utilizes the ascendent path or the descendent path for handling a telephone signal stream or a data stream. The appearance and the disappearance of this code signal $S_4$ consequently permits detecting the changes of the transmission direction of the telephone signal and the end of the data messages.

Figure 2:
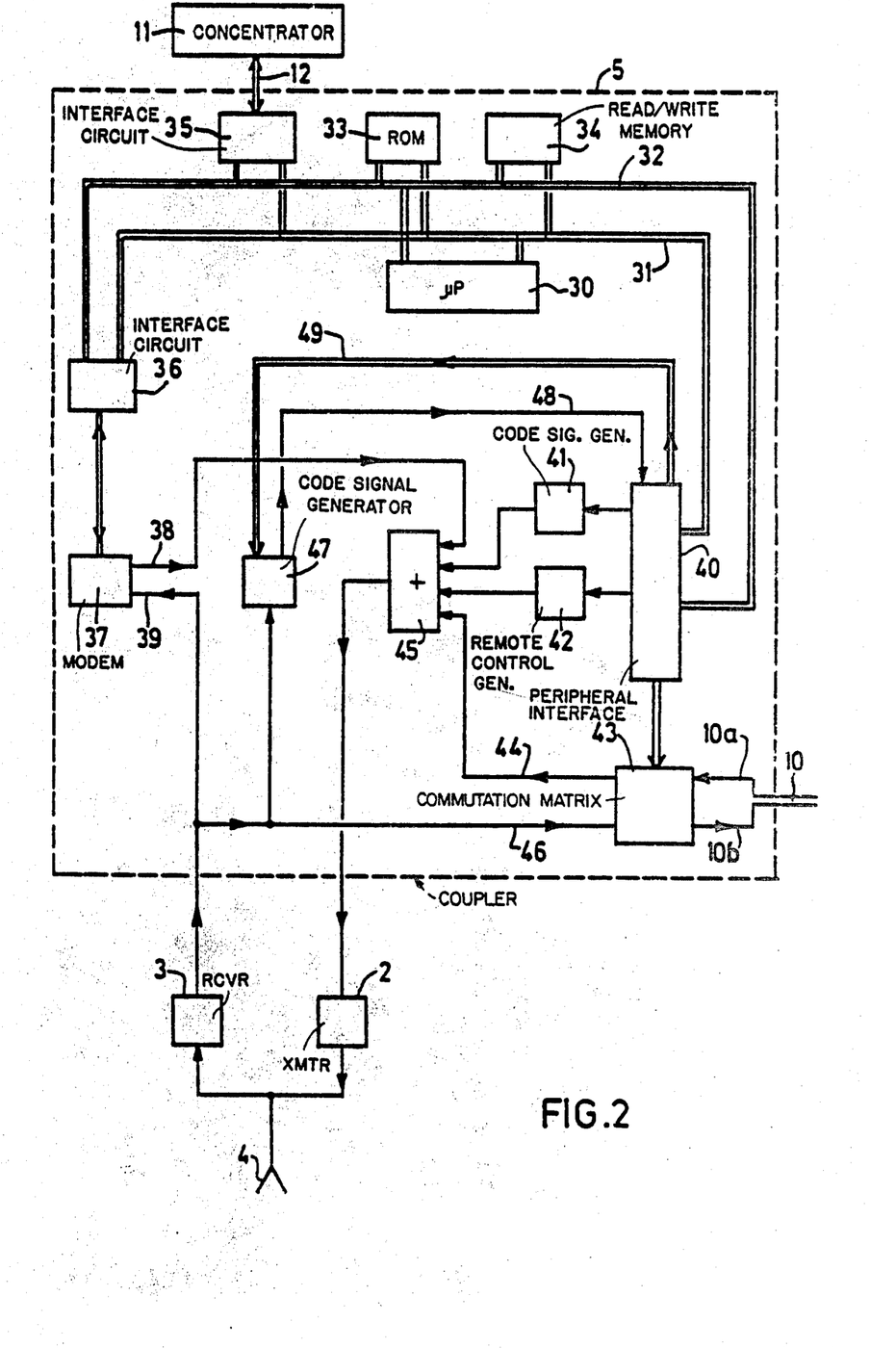
FIG. 2 shows the circuit diagram of a coupler disposed in the main station of a radio cell and suitable for use in the method according to the invention.

In order to understand more clearly how the traffic is organized in a radio channel, such as the channel $C_1$, with the use of the method according to the invention, FIG. 2 represents the structure which the coupler 5 of this channel can assume, only the essential elements being shown. As is shown in FIG. 2, this coupler 5 is connected on one side to the transmitter-receiver apparatus constituted by transmitter 2, the receiver 3 and the antenna 4. The coupler 5 is connected on the other side to the concentrator 11 through the connection bus 12 for handling the data stream; finally, the coupler 5 is connected to another identical coupler 9 (not shown) through a connection 10, as in FIG. 1, for handling the telephone signal stream. This connection 10 consists of a transmission bus 10a, which receives from the other coupler 9 a telephone signal to be transmitted by the transmitter 2, and of a reception bus 10b, which transmits a telephone signal received by the receiver 3 to the other coupler 9.

In the embodiment shown in FIG. 2, the regulation of the streams is effected under the control of a microprocessor 30. The latter is connected to an address bus 31 and a data bus 32. A read-only memory 33 and a read/write memory 34, associated with the microprocessor 30, are connected to the two buses 31 and 32. These two buses 31, 32 have also connected to them an interface circuit 35 connected with the concentrator 11 over the bus 12 and an interface circuit 36 connected with a MODEM 37. The MODEM 37 can receive data from outside the radio channel through the concentrator 11 and can supply at its output 38 a corresponding signal modulated in the telephone band; it can receive at its input 39 such a modulated signal originating from the receiver 3 and can recover data to be directed outside of the channel through the concentrator 11.

The organization of the stream by means of the code signals, the remote control of the terminal stations and the commutation of the telephone signals, are effected under the control of the microprocessor 30 through a peripheral interface circuit 40 which is connected to the two buses 31 and 32. The interface circuit 40 is connected to a code signal generator 41, a remote control generator 42 and a commutation matrix 43. Under the control of the microprocessor 30, the generator 41 supplies one of the code signals $S_0$, $S_1$, $S_2$, $S_3$ or $S_4$ and the generator 42 supplies test or remote control sequencies (in the form of, for example, tones in the band of 300–3000 Hz) for controlling the relay stations, such as $R_1$. Under the control of the microprocessor 30, the commutation matrix 43 receives, through the transmission bus 10a, a telephone signal originating from the other coupler 9 and diverts it to its output 44. This telephone signal is applied to the summing circuit 45, to which, under the control of the microprocessor 30, there are also applied the code-signals produced by the generator 41, test and remote control sequencies produced by the generator 42, and finally modulated data signals originating from the output 38 of the MODEM 37. The output signal of the summing circuit 45 is applied, as a modulation signal, to the transmitter 2, the information contained in this signal then being transmitted through the descendent path of the radio channel. Through the ascendent path of the radio channel, the receiver 3 can receive in the telephone band, a data signal or a telephone signal and in the supervisory band, the code signal $S_4$. The signal supplied by this receiver 3 is applied to the input 39 of the MODEM 37 and to the input 46 of the commutation matrix 43, which diverts the telephone signal through the reception bus 10b to the other coupler 9 under the control of the microprocessor 30. Finally, the signal supplied by the receiver 3 is applied to a detector 47 which detects the code signal $S_4$, whose output information is supplied to the microprocessor 30 through the connection 48 and the interface circuit 40. The content of the output information of the detector 47 depends upon a programmed signal supplied by the microprocessor 30 through the interface circuit 40 and the bus 49.

In order to respond to the code signals generated in the main station 1, the terminal arrangement 28 in each terminal station further includes detectors for detecting the various code signals $S_0$, $S_1$, $S_2$ and $S_3$, signal generators for generating the code signal $S_4$ and a transmission request signal, and means connected to the detector for controlling the signal generators and the transmitter 26, this controlling means being, for example, a microprocessor.

Figure 3:
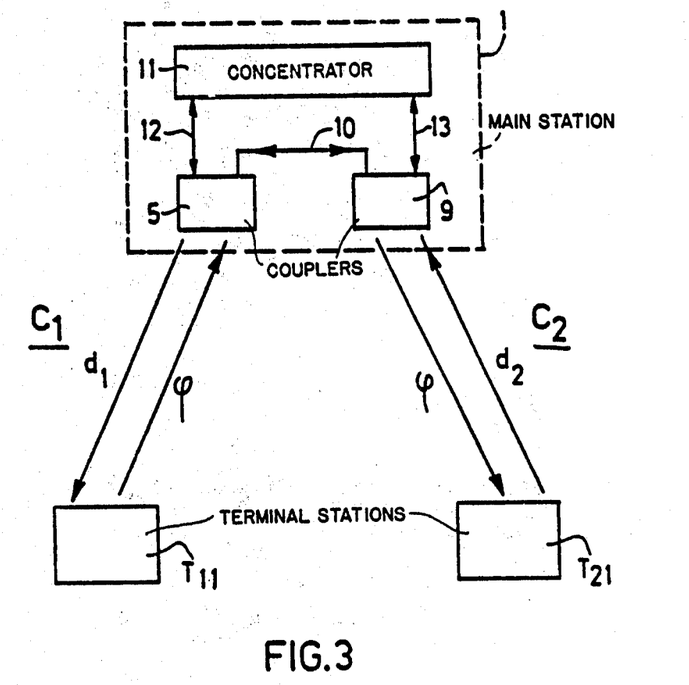
FIG. 3 shows a circuit diagram illustrating, in a simplified manner, two terminal stations of two radio channels communicating simultaneously in both senses through the main station of the cell.

The method according to the invention will be explained starting from the situation of a radio cell shown diagrammatically in FIG. 3. In FIG. 3, the same reference symbols as in FIG. 1 are used for the main station 1 provided with the couplers 5 and 9 of the radio channels $C_1$ and $C_2$, these couplers 5, 9 being interconnected through the connection 10 for handling the telephone signal stream. The couplers 5 and 9 are moreover connected, respectively, through the connections 12 and 13, to the concentrator 11 for handling the data stream. The ascendent and descendent paths of the two radio channels $C_1$ and $C_2$ are indicated by arrows. Two terminal stations in telephone connection, the station $T_{1l}$ of the channel $C_1$ and the station $T_{2l}$ of the channel $C_2$, are considered. It is assumed that at a given instant, the transmission of the telephone signals, represented by $\phi$ in FIG. 3 is effected in the direction of the ascendent path of the channel $C_1$ and the descendent path of the channel $C_2$. At this instant, the descendent path of the channel $C_1$ is occupied by a data signal $d_1$ and the ascendent path of the channel $C_2$ is occupied by a data signal $d_2$, which, in general, differs from $d_1$.

Figure 4:
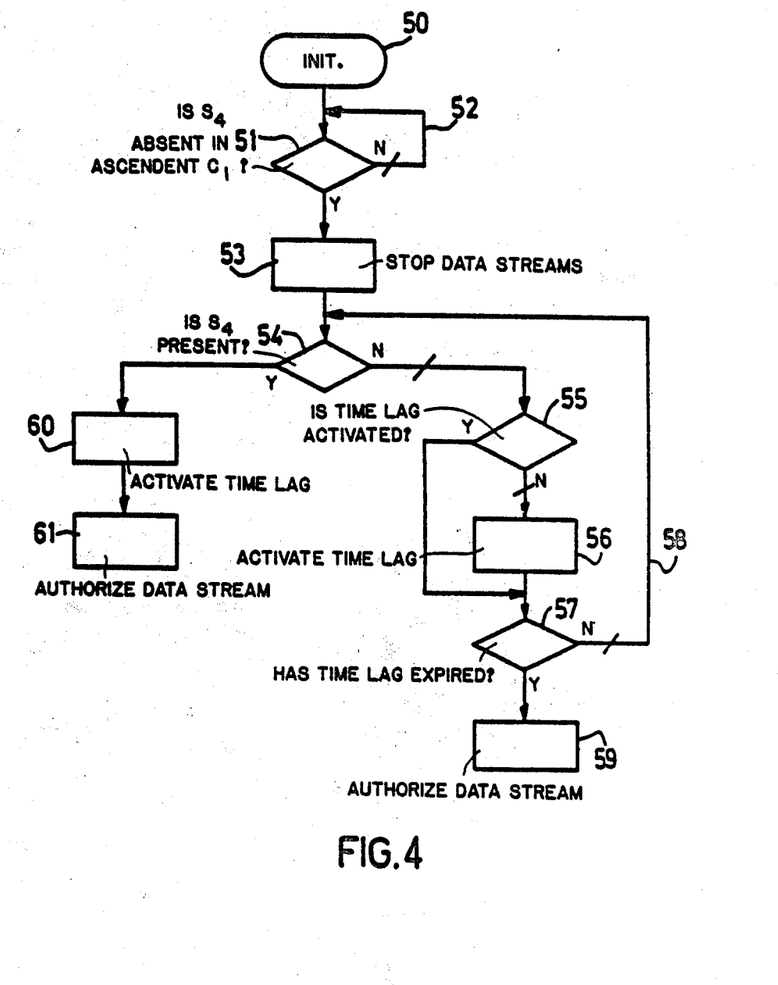
FIG. 4 is a flow chart intended to explain the steps to be followed in the method according to the invention, in the case where a descendent path becomes unoccupied during a telephone signal stream.

The flow chart of FIG. 4 shows the beginning of the process effected in the main station for the optimum use of the two paths of each radio channel during the telephone conversation. The box 50 represents, for the radio cell, the initial situation illustrated in FIG. 3, for which especially the ascendent path of $C_1$ transmits telephone signals $\phi$, the code signal $S_4$ always accompanying an information signal. The stage represented by the box 51 is a test of the absence of the code signal $S_4$ in the ascendent path of the channel $C_1$. As long as this absence of $S_4$ is not ascertained, there is not aimed at a reversal of the telephone transmission and the check is continued: the loop is closed through the connection 52. An absence of the code signal $S_4$ means the end of a telephone transmission through the ascendent path and a possible reversal of the telephone transmission. Under the control of the couplers 5 and 9, this absence of the code signal $S_4$ brings about, at the stage represented by the box 53, a stoppage of the data stream $d_1$ in the descendent path of the channel $C_1$ and the data stream $d_2$ in the ascendent path of the channel $C_2$. At the next following stage represented by the box 54, the couplers 5 and 9 carry out a test of the presence of the code signal $S_4$, the coupler 5 in the ascendent path of the channel $C_1$ and the coupler 9 in the ascendent path of the channel $C_2$.

If the code signal $S_4$ is not present at all, the process is continued in the right hand branch of the box 54 by a check in the box 55 of the activation of a time lag at the end of a telephone transmission. If this check yields a negative result, the activation of the time lag is effected in the box 56 and it is checked in the box 57 whether this time lag has expired. If the check of the activation of the time lag in the box 55 yields a positive result, it is also checked in the box 57 whether the time lag has expired. As long as the time lag has not expired, the couplers 5 and 9 continue to detect the presence or absence of the code signal $S_4$ in one or the other of the ascendent paths of the two channels, the loop is being closed through the connection 58. If the time lag has expired, the stage represented by the box 59 is carried out, i.e., the absence of the code signal $S_4$ before the end of the time lag indicates that none of the interlocutors, initially in conversation, has started to speak again; a data stream is then authorized through the ascendent and descendent paths of the two channels $C_1$ and $C_2$.

If during the operation effected in the box 54, the code signal $S_4$ is detected in one or the other of the ascendent paths of the two channels $C_1$ and $C_2$, the process is continued in the lefthand branch of this box 54, by the readjustment in the box 60 of the time lag activated in the box 56. If the code signal $S_4$ is detected in the channel $C_1$, this means that the telephone signal stream is handled in the manner shown in FIG. 3 through the decendent path of the channel $C_1$ and the ascendent path of the channel $C_2$, the descendent path of the channel $C_1$ and the ascendent path of the channel $C_2$ then being unoccupied. If the code signal $S_4$ is detected in the channel $C_2$, this means that a reversal of the direction of the telephone signal stream has taken place and that the ascendent path of $C_1$ and the descendent path of $C_2$ are unoccupied. At the stage represented by the box 61, a data stream is authorized through the unoccupied paths of the two channels.

At the end of the stages represented by the respective boxes 59 and 61, each coupler 5 or 9 authorizes a data stream through the unoccupied path, or the two unoccupied paths, of the respective channel that it controls. The diversion of a data stream through a descendent path to a given terminal station does not give rise to special problems. On the contrary, several terminal stations can ask, at the same time, for permission to use an ascendent path and the problem arises of the selection of a terminal station to be effected from the main station 1.

This selection has only to take into account the priority levels assigned to the different types of possible traffic streams. It is assumed hereinafter that the terminal stations can ask permission to transmit messages at three priority levels:

a superpriority level SP, a priority level P, a non-priority level NP.

Figure 5:
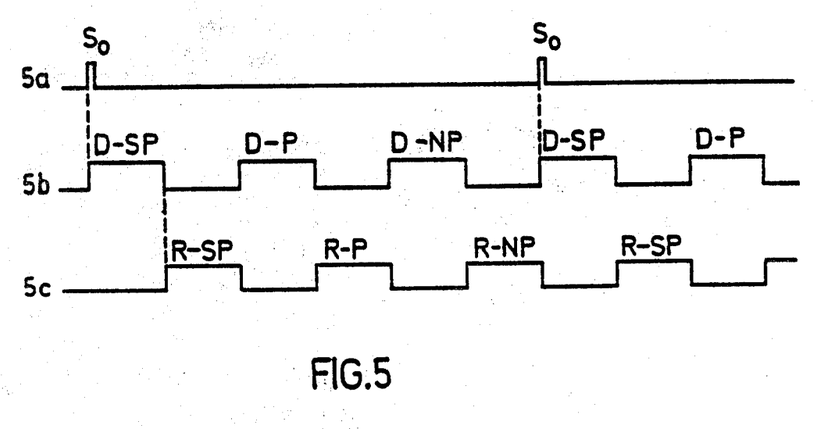
FIG. 5 shows a diagram illustrating the distribution in time of the call and answer windows.

The selection is effected at the end of a dialogue between the main station 1 and the terminal stations, the calls and the answers being effected in time windows, as shown in the diagrams of FIG. 5.

The diagram 5a shows several code signals $S_0$ transmitted by the main station 1 of a radio channel through the descendent path of this channel in order to give the terminal stations an indication that they have the possibility to utilize an ascendent path. The diagram 5b shows time windows in which the terminal stations can transmit their calls for the use of the ascendent path. The first call window D-SP, according to the code signal $S_0$, can be utilized for the calls having superpriority. The second call window D-P, according to the code signal $S_0$, can be utilized for the calls having priority. Finally, the third call window D-NP can be utilized for the calls having no priority. The calls of the terminal stations are effected in the form of a known data message in the main station 1. As long as at least one call has not been detected by the main station 1 in one of the aforementioned call windows, the main station 1 transmits periodically the code signal $S_0$ at most for a period equal to a period in which a radio channel is held in the operating condition.

The diagram 5c shows time answer windows R-SP, R-P and R-NP corresponding to the call windows D-SP, D-P and D-NP, respectively, utilized by the main station 1 for transmitting code signals through the descendent path.

When the main station 1 detects a single call in one of the call time windows D-SP, D-P or D-NP, it analyses this call and if this call is perfectly distinct (no errors in the call message), it transmits the code signal $S_3$ in the answer time window R-SP, R-P or R-NP immediately following the call time window in which the call has been detected. This answer, in the form of the code signal $S_3$, is interpreted, by the terminal station having transmitted the call, as an authorization to utilize the ascendent path and by the other terminal stations having a lower level of priority as a prohibition to utilize this ascendent path. The terminal station authorized to transmit through the ascendent path, remains in the inoperative condition for a predetermined period of time in order to receive, as the case may be, another code signal (for example, $S_2$) which prohibits it to transmit. When this counter-order waiting time has elapsed, if the terminal station has received nothing, it can utilize the ascendent path to transmit its data stream.

When in a call time window D-SP, D-P or D-NP the main station 1 detects a call, which, after having been analysed, proves to be not perfectly distinct, the main station 1 presumes a conflict between terminal stations having transmitted calls at the same priority level and initiates a dichotomy process based on the binary address of the terminal stations in order to assign the ascendent path to one of these terminal stations. During this dichotomy process, which is only concerned with terminal stations having the same priority level, the call and answer time windows are not differentiated and are all utilized to solve the conflict.

The dichotomy process mentioned above starts by an initial stage, during which several terminal stations at the same priority level transmit a call, at the end of which the main station 1, having detected a conflict between these calls, transmits a first code signal $S_1$ in the direction of these terminal stations. At the following stages, the main station 1 transmits either the code signal $S_1$, if it detects still a conflict, or the code signal $S_2$ if it does not detect any call. The dichotomy process ends when the main station 1 does not receive more than one call from the terminal station; the main station 1 then transmits the code signal $S_3$ which, as has been already explained, is interpreted, by the last terminal station having transmitted a call, as an authorization to utilize the ascendent path.

In each terminal station participating in the dichotomy process, comparisons are successively carried out of each bit of the address assigned to the terminal arrangement with a comparison bit, the value of which depends upon the code signal $S_1$ or $S_2$ received from the main station 1. The terminal station in which the two compared bits of which have the same value, transmits a new call, while the terminal station in which the two compared bits of which have different values, does not transmit any call.

At the first stage of the dichotomy process, the terminal stations receive the code signal $S_1$ transmitted by the main station 1 at the end of the initial stage. For this first stage, the comparison bit has, for example, the fixed value 1 so that the terminal station, the first bit of which has a value 1, transmits a new call, whereas the terminal station, the first bit of which has the value 0, does not transmit any call.

At the $n^{th}$ stage of the dichotomy process, the terminal stations receive the code signal $S_1$ or $S_2$ transmitted by the main station 1 at the end of the preceding stage. The comparison bit used in this $n^{th}$ stage, has the same value as the comparison bit of the preceding stage if the received code signal is $S_1$ and has a different value if the code signal is $S_2$. At this $n^{th}$ stage, only those terminal stations transmit a new call, the $n^{th}$ address bit of which has the given value, whereas the terminal stations, the $n^{th}$ address bit of which has the other value, do not transmit any call.

As the terminal stations all have different addresses, the process just described terminates compulsorily in that a single terminal station transmit a new call, all the other stations having been eliminated.

By way of example, it is illustrated how this process can be applied to the selection of a terminal station among two terminal stations $T_1$ and $T_2$ having the respective addresses:

For $T_1$: 1 1 1 0 0 0
for $T_2$: 1 1 1 0 1 0.

For this explanation, the following Table I is used:

TABLE 1

| | | Terminal stations | | | | main station | |
| | | $T_1$ | | | $T_2$ | | |
| No. | Reception | $b_c$ | $b_{1a}$ | transmission | $b_{2a}$ | transmission | reception | transmission |
| --- | --- | --- | --- | --- | --- | --- | --- | --- |
| 0 | $S_0$ | | | D | | D | conflict | $S_1$ |
| 1 | $S_1$ | 1 | 1 | D | 1 | D | conflict | $S_1$ |
| 2 | $S_1$ | 1 | 1 | D | 1 | D | conflict | $S_1$ |
| 3 | $S_1$ | 1 | 1 | D | 1 | D | conflict | $S_1$ |
| 4 | $S_1$ | 1 | 0 | N | 0 | N | vacancy | $S_2$ |
| 5 | $S_2$ | 0 | 0 | D | 1 | N | distinct | $S_3$ |

The first column indicates the numbers of the stages of the dichotomy process. In the following columns concerning the terminal stations, the column "Reception" indicates the code signal received at each stage, the column $b_c$ indicates the comparison bit dependent upon the received code signal; in the two columns concerning the station $T_1$, the column $b_{1a}$ indicates the address bit compared at each stage with the comparison bit, and the column "Transmission" indicates with the letter D or N whether the station transmits or does not transmit a call; in the two columns concerning the station $T_2$, the columns $b_{2a}$ and "Transmission" have analogous meanings. In the last two columns concerning the main station, the column "Reception" indicates whether the main station 1 detects a conflict, the absence of a call (vacancy) or a single call which is distinct; the last column "Transmission" indicates the code signal $S_1$, $S_2$ or $S_3$ transmitted by the main station.

It can be seen from Table I that at the initial stage 0 the terminal stations $T_1$ and $T_2$ receive the code signal $S_0$ and transmit a call; as a result, the main station detects a conflict and transmits the code signal $S_1$. At the stage 1, the terminal stations receive the code signal $S_1$; as a result, for this first stage the comparison bit $b_c$ has a value "1"; the first address bits $b_{1a}$ and $b_{2a}$ of the two stations each have a value "1", like the comparison bit, so that the two stations transmit a call; the main station 1 again detects a conflict and consequently transmits the code signal $S_1$. At the stage 2, as the received code signal is $S_1$, the comparison bit $b_c$ has the same value as at the stage 1, that is to say that it has a value "1"; the comparison of the second address bit of the two stations with the comparison bit finally produces a call from the two stations; the conflict detected by the main station 1 results in that the code signal $S_1$ is again produced therein. At the stage 3, the third address bits of the respective two stations are compared, which stage is identical to the stage 2. At the stage 4, the code signal received in the two stations $T_1$ and $T_2$ is still $S_1$ and the comparison bit $b_c$ still has the value "1"; however, as the fourth address bit of the two stations has the value "0" and is consequently different from the comparison bit, the two stations both do not transmit any call; the main station, which now does not detect any call, transmits the code signal $S_2$. At the stage 5, the code signal received in the two stations $T_1$ and $T_2$ is $S_2$, the comparison bit $b_c$ has a value different from that of the comparison bit of the stage 4 and consequently has a value "0"; since the fifth address bit of the station $T_1$ also has a value "0" and the fifth bit of the station $T_2$ has a value "1", only the station $T_1$ transmits a call; this call is distinctly received by the main station 1 which transmits the code signal $S_3$ to authorize the station $T_1$ to utilize the ascendent path of the radio channel.

The address of the terminal stations utilized in the dichotomy process may have a number of bits determined by the total number of the stations of the communications network or by the more strongly reduced number of the terminal stations of each radio channel. It is more advantageous to use the second solution in which the address of the terminal arrangements has a lower number of bits, as a result of which the number of stages of the dichotomy process is reduced and consequently the time required for the selection of a station is shortened. However, when the same address is always used for the dichotomy process, given terminal stations are always favored when they come into conflict with other stations; for example, in the embodiment described above, if the terminal stations $T_1$ and $T_2$ come into conflict, the terminal station $T_2$ will always be eliminated. An advantageous solution in this respect consists in that in each terminal station at the instant of each reception of the code signal $S_0$, a random draw is effected for assigning to each station a so-called dichotomy address utilized only for the dichotomy process according to this code signal $S_0$.

It is possible that a dichotomy process is disturbed by an interference in the connection between the terminal stations and the main station 1. The interfered signal received by the main station 1 is interpreted by the latter as a conflict between terminal stations so that the main station 1 transmits during the interference time the code signal $S_1$. The system then remains blocked in dichotomy at the superpriority level and cannot select a single terminal station as long as the interference is present in the time window at this same priority level. Departing from this situation, it is advantageous that, when the normal number of the dichotomy stages has been attained without a station being selected, a new code signal $S_0$ is transmitted by the main station 1 to try and select a terminal station. The stages succeeding the transmission of this new code signal $S_0$ will be explained more fully with reference to FIG. 6, which shows a flow chart describing the whole process carried out in the main station 1 of a radio channel for the selection of a terminal station when the ascendent path of this radio channel becomes unoccupied. In order to simplify the description of the process illustrated by this flow chart, the different members of the main station 1 utilized at each stage of the process are not shown, which members can readily be derived from the circuit diagram of the coupler 5 of the main station 1 shown in FIG. 2.

Figure 6:
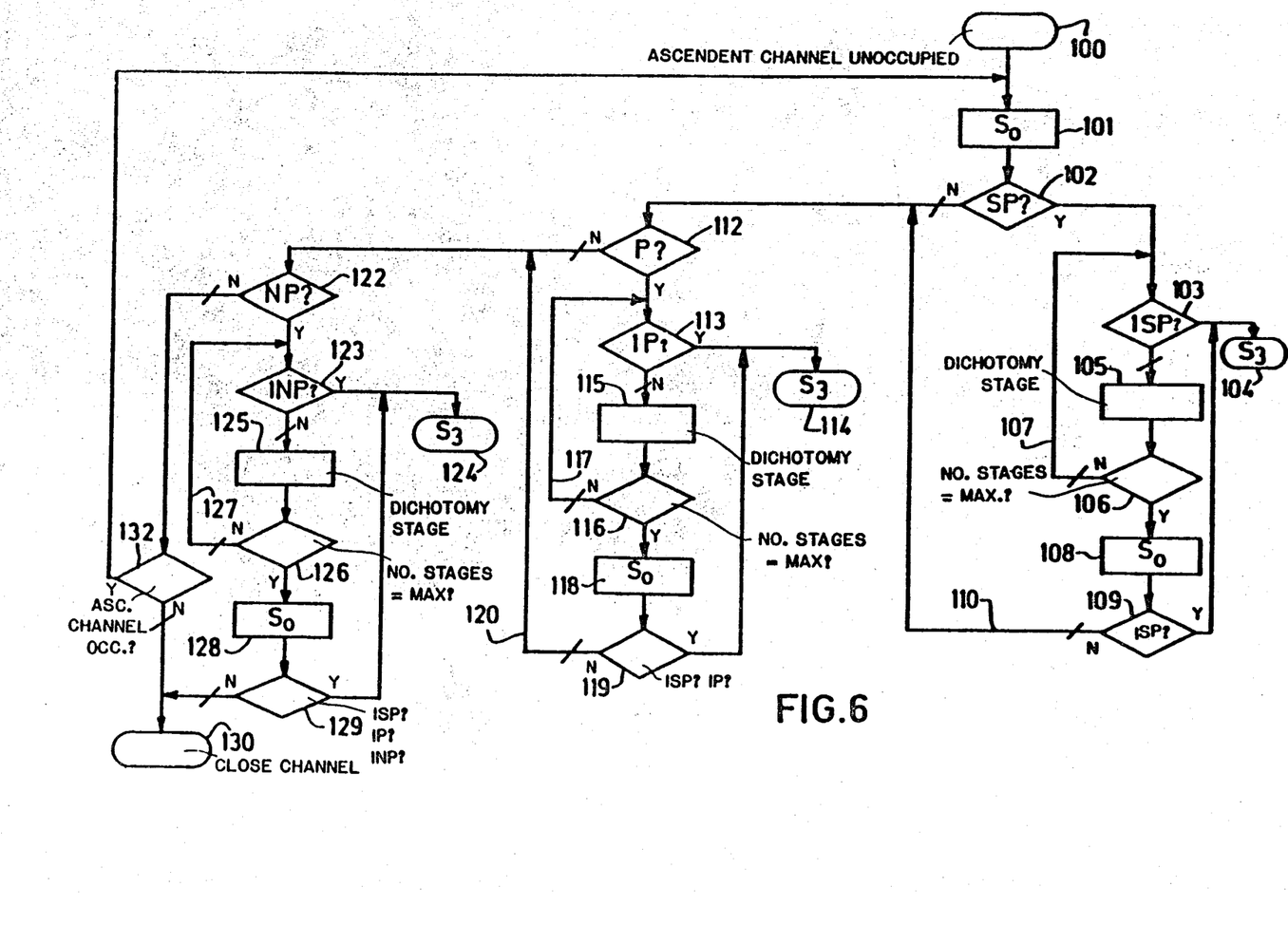
FIG. 6 is a flow chart intended to explain the method according to the invention.

In FIG. 6, box 100 indicates that the ascendent path of a radio channel is identified as being unoccupied by the main station, for example, after a reversal of a telephone signal stream according to the process described with reference to FIG. 4. The box 101 indicates that the main station 1 then transmits through the descendent path the code signal $S_0$. At the next stage, the box 102, the main station 1 checks whether a signal is received in the time window D-SP (see FIG. 5) relating to the superpriority calls, if a signal is received in the window D-SP, the next stage, represented by the box 103, consists in checking whether the signal is received in a distinct manner or not. If the received signal is distinct, a single superpriority call has been transmitted; the main station then authorizes the requested stream through the ascendent path (box 104) by transmission of the code signal $S_3$, as has already been explained. If the received signal is not distinct, the main station 1 presumes that several superpriority calls have been transmitted and then starts the dichotomy process described above. This process is represented by a loop comprising in the negative output branch of the box 103, the box 105, representing the dichotomy stage, and the box 106 representing a comparison between the number of dichotomy stages carried out and the maximum number of provided stages. As long as this maximum number has not been attained (connection 107), a check is continually carried out at each dichotomy stage whether the received signal is distinct or not, which, under the normal conditions of the connection between the main station 1 and the terminal stations, has to terminate in the authorization of the traffic for a terminal station (box 104). If the maximum number of dichotomy stages is attained, in the next stage, represented by the box 108, the main station 1 transmits a new code signal $S_0$. At the stage then represented by the box 109, the main station checks in the time window D-SP according to the new code signal $S_0$ whether a compulsory superpriority call is received distinctly. If this is the case, the main station authorizes the requested traffic through the ascendent path: box 104. If this is not the case, the main station presumes an interference, which renders the assignment of the ascendent path to a superpriority caller impossible; the connection 110 then indicates that the next stage is represented by the box 112, in which is checked whether a signal is received in the time window D-P relating to the priority calls.

This check in a priority call window could also have been effected after the first transmission of the code signal $S_0$ (box 101) if the check in a superpriority call window (box 102) had not revealed a single call. The process of treating the priority calls is apparently the same as that of the superpriority calls. This process is represented by the boxes 112 to 119 which are interconnected in the same manner as the boxes 102 to 109 and which represent the same stages with the sole difference concerning box 119. At the stage of box 119, the main station 1 checks after the transmission of the code signal $S_0$ at the stage 119 whether a distinct call is received in the superpriority call window D-SP or in the priority call window D-P. If this is the case, the traffic first requested by a distinctly received call is authorized in the ascendent path: box 114. If this is not the case, the main station 1 presumes an interference and the next stage is represented by the box 122, in which it is checked whether a signal is received in the time window D-NP concerning the non-priority calls.

This check in a non-priority call window could also have been effected if the check of a priority call window (box 112) had not revealed a single call. The process of treating the non-priority calls is apparently the same as that of treating the superpriority and priority calls. It is represented by boxes 122 to 129 interconnected like the boxes 112 to 119 and representing the same stages; however, at the stage of the box 129, the main station 1 checks whether after the transmission of the code signal $S_0$ at the stage of the box 128, a distinct call is received in the superpriority call windows, priority call windows or non-priority call windows. If this is the case, the traffic first requested by a distinctly received call is authorized through the ascendent path: box 124. If this is not the case, the main station 1 puts all the members of the radio channel in the inoperative condition, which contribute to carrying out the process just described: box 130. In the case in which at the stage of the box 122 it has been found that no signal is received in a non-priority call window, the next stage is represented by the box 132. At this stage, the main station 1 checks whether the ascendent path is occupied by an information stream. If this is the case, the stage represented by box 101 is reached again and the process of searching and selecting a terminal station is started again. If this is not the case, because no information stream is present in the descendent path and is not requested in the ascendent path, the radio channel is put in the inoperative condition: box 130.

The method according to the invention can be carried out advantageously in the main station 1 by using therein the coupler 5 provided with the microprocessor 30 of the kind shown in FIG. 2. It will be clear to those skilled in the art that all the stages of the method according to the invention, shown diagrammatically in the flow charts of FIGS. 4 and 6, can be effected by the microprocessor 30 under the control of a program stored in the read-only memory 33. Thus, the microprocessor 30 can produce signals for controlling the code signal generator 41 in order to control the transmission by the transmitter 2 of one of the code signals $S_0$, $S_1$, $S_2$, $S_3$ or $S_4$. The microprocessor 30 can process call time windows according to the transmission of a code signal $S_0$, during which it analyses the signals reaching it via the receiver 3, the MODEM 37 and the interface circuit 36. By comparison of the received signals with predetermined call messages, the microprocessor 30 can decide whether the signal received in each control window corresponds to a distinct call, to several simultaneous calls or to the absence of a call. Dependent upon this decision, the microprocessor 30 can control the code signal generator 41 so that the latter produces the correct code signal in an answer time window according to the call time window in which the received signal has been analyzed.

What is claimed is:

1. A method for controlling the information stream in a radio cell constituting several radio channels connecting each of a plurality of terminal stations to a main station of the cell through an ascendent path and a descendent path, these two paths being capable of transmitting code signals together with an information stream, while the information stream to be handled can have several priority levels, this method being intended to grant, from the main station, the authorization to use the ascendent path of each radio channel to a terminal station among several of these stations that can request this authorization, characterized in that the method comprises the steps:

a. transmitting, from the main station through the descendent path of each radio channel the ascendent path of which becomes unoccupied, a code signal $S_0$;
   b. transmitting, from the terminal stations having a stream to be handled through the ascendent path, requests for the use of this ascendent path in call time windows, each being assigned a priority level in a decreasing order of priority levels;
   c. analyzing at the main station the signals received in the successive call windows, and when at least one signal is received in a call window, transmitting an answer from the main station in an answer time window immediately succeeding the relevant call window, in the form of a code signal dependent upon the received signal;
   c1. transmitting, if the received signal is a distinct call, from the main station, a code signal $S_3$ in order to authorize the terminal station, which had transmitted the request, to utilize the ascendent path;
   c2. transmitting, if the received signal corresponds to several simultaneous calls, from the main station, a first code signal $S_1$, preventing the transmission of the request of lower priority and initiating a dichotomy process;
   c3. said dichotomy process being performed reiteratively in stages which include transmitting from the main station, in an answer window, one of the code signals $S_1$, $S_2$, or $S_3$, accordingly, as the main station detects, in a call window, a signal corresponding to several simultaneous calls, to the absence of a call or a distinct call, respectively, and deducing, at each terminal station receiving the code signal $S_1$ or $S_2$, whether a new call has to be transmitted or is not to be transmitted in a call window, in accordance with a criterion dependent upon each bit of a unique digital address assigned to each terminal station and upon the received code signal $S_1$ or $S_2$; a terminal station receiving the code signal $S_3$ being authorized to utilize the ascendent path.

2. A method as claimed in claim 1, characterized in that said criterion utilized in the dichotomy process comprises comparing, in each terminal station receiving the code signal $S_1$ or $S_2$, successively, each bit of its address with a comparison bit having for the first stage of the process a given value and for the following stages, according to the code signal $S_1$ or $S_2$ received, a value equal or opposite to that of the comparison bit utilized for the preceding stages, and transmitting a new call in a call window if the two compared bits have the same value.

3. A method as claimed in claim 1 characterized in that, when the number of stages of the dichotomy process initiated for the calls at a given priority level exceeds a maximum value corresponding to the number of address bits of the terminal stations, transmitting from the main station a new code signal $S_0$; transmitting, from the terminal stations having an information stream to be handled, calls according to b; analyzing, in the main station, the signals received according to c; transmitting from the main station the code signal $S_3$, if one of the signals received in the call windows at a superpriority level or at a level equal to the priority level is a distinct call, to give the terminal station having transmitted the call the authorization to use the ascendent path; if none of the received signals is distinct, analyzing, in the main station, the signal received in the call window corresponding to the immediately lower subsequent priority level, the method being continued according to c1, c2, and c3.

4. A method as claimed in claim 1, characterized in that the address of the terminal stations utilized in the dichotomy process is supplied by a random draw effected in each terminal station at the instant of reception of the code signal $S_0$.

5. A method as claimed in claim 1, characterized in that the code signals $S_0$ to $S_3$ are transmitted in a supervisory band situated below or above the band of the information signal.

6. A method as claimed in claim 5, characterized in that each of the code signals $S_0$ to $S_3$ is constituted by two tones transmitted during a given period and having frequencies situated in the supervisory band.

7. In a radio cell constituting several radio channels connecting each of a plurality of terminal stations to a main station thereof through an ascendent path and a descendent path, these two paths being capable of transmitting code signals together with an information stream, while the information to be handled can have several priority levels, a device in said main station for controlling the information stream, said device granting authorization to use the ascendent path of each radio channel to a terminal station among several of said terminal stations that request this authorization, characterized in that said device comprises a microprocessor which, under the control of a detector which detects the absence of a code signal $S_4$ in the ascendent path which code signal $S_4$ indicates said ascendent path being in use controls a code signal generator for transmission, through the descendent path, of a code signal $S_0$, indicating that said ascendent path is not in use, said microprocessor then analyzing, during call time windows, the received signals carried along through the ascendent path by comparing these signals with predetermined call messages, and finally controlling the code signal generator for transmitting, through the descendent path, one of a plurality of code signals $S_1$, $S_2$ or $S_3$ according to the result of the comparison, or for transmitting the code signal $S_0$ wherein when several calls are received simultaneously, the code signal $S_1$ is transmitted for preventing a terminal station from transmitting a lower priority call, the code signal $S_2$ is transmitted if, subsequent to the code signal $S_1$, there is an absence of a call request, and the code signal $S_3$ is transmitted to authorize the use of said ascendent path.

* * * * *